(12) United States Patent
Lavine et al.

(10) Patent No.: US 11,342,721 B1
(45) Date of Patent: May 24, 2022

(54) BEAM DIRECTOR FOR HIGH-ENERGY LASER (HEL) WEAPON

(71) Applicant: Raytheon Company, Waltham, MA (US)

(72) Inventors: Jason R. Lavine, McKinney, TX (US); Justin T. Martin, Anna, TX (US); Liam Skoyles, Allen, TX (US)

(73) Assignee: Raytheon Company, Waltham, MA (US)

( * ) Notice: Subject to any disclaimer, the term of this patent is extended or adjusted under 35 U.S.C. 154(b) by 612 days.

(21) Appl. No.: 16/406,414

(22) Filed: May 8, 2019

(51) Int. Cl.
| | |
|---|---|
| *G01B 11/27* | (2006.01) |
| *H01S 3/00* | (2006.01) |
| *G01S 17/66* | (2006.01) |
| *F41H 13/00* | (2006.01) |
| *G01J 9/00* | (2006.01) |

(52) U.S. Cl.
CPC ....... *H01S 3/0071* (2013.01); *F41H 13/0062* (2013.01); *G01J 9/00* (2013.01); *G01S 17/66* (2013.01)

(58) Field of Classification Search
None
See application file for complete search history.

(56) References Cited

U.S. PATENT DOCUMENTS

| | | | |
|---|---|---|---|
| 4,102,572 | A | 7/1978 | O'Meara |
| 7,236,299 | B1 | 6/2007 | Smith |
| 8,218,589 | B1 | 7/2012 | Saunders |
| 2003/0062468 | A1 | 4/2003 | Byren |
| 2003/0174315 | A1 | 9/2003 | Byren |
| 2008/0042042 | A1 | 2/2008 | King et al. |
| 2010/0282942 | A1 | 11/2010 | Mosier et al. |
| 2012/0018614 | A1 | 1/2012 | King |
| 2017/0234658 | A1 | 8/2017 | Segev et al. |
| 2020/0141795 | A1 | 5/2020 | Lavine |

FOREIGN PATENT DOCUMENTS

| | | |
|---|---|---|
| DE | 3202432 C2 | 4/1987 |
| WO | 2020/226721 A1 | 11/2020 |

OTHER PUBLICATIONS

Invitation to Pay Additional Fees dated Sep. 30, 2021 in corresponding International Application No. PCT/US2021/038385.
International Search Report and Written Opinion for corresponding International Application No. PCT/US20/019242 dated Oct. 9, 2020.

*Primary Examiner* — Elmito Breval
(74) *Attorney, Agent, or Firm* — Renner, Otto, Boisselle & Sklar LLP

(57) ABSTRACT

A beam director system for a high-energy laser (HEL) weapon includes correction sensors that are able detect misalignments in optical elements throughout the entire optical path traversed by the high-energy laser. The system includes beam correction sensors that sense misalignments in a first part of the optical path, and high-speed track sensors that sense misalignments in a second part of the optical path, with the first part and the second part overlapping. This allows all optics to be sensed by the beam correction sensors and/or the high-speed track sensors. The system can accommodate a wide variety of lasers for the HEL, preferably including a co-boresighted and aligned alignment laser. By having the track sensors further downstream on the optical path than in prior devices, the acquisition and track sensor fields of view of the system may be improved.

20 Claims, 4 Drawing Sheets

BEAM DIRECTOR FOR HIGH-ENERGY LASER (HEL) WEAPON

FIELD OF THE INVENTION

The invention is in the field of high-energy laser weapons.

DESCRIPTION OF THE RELATED ART

Directed energy weapons pose special problems with regard to beam direction, for example having poor performance for intelligence, surveillance, and reconnaissance (ISR) systems, limited fields of view (FOVs) for tracking sensors, and/or poor boresight performance. Non-monostatic designs generally do not have good boresight maintenance due to parallax and consistently have issues with holding a beam on-target for sufficient periods to match lethality modeling. In addition systems may require complicated optical measurement to provide high speed safety for high-energy laser (HEL) optics. There may also be problems in holding an energy weapon on target for a sufficient time to disable or destroy a target.

Accordingly there is room for improvement in the field of directed-energy weapons such as those involving high-energy lasers.

SUMMARY OF THE INVENTION

A high-energy laser weapon system has optical tracking throughout a full optical path of the system.

A high-energy laser weapon system has optical tracking that covers all optical element of an optical path through the system. The optical path may handle multiple beams over at least parts of its path, including a high-energy laser beam, as well as one or more additional beams, such a target-tracking beam.

A high-energy laser weapon system has retro-reflection through part of its optical path, enabling beam aimpoint analysis in a high-speed track sensor.

A high-energy laser weapon system provides for stabilized co-aligned beams traveling along a common optical path.

According to an aspect of the invention, a beam director system includes: output optics downstream of a high-energy laser (HEL) beam source that provides a HEL beam; first beam correction elements downstream of the HEL beam source; second beam correction elements downstream of the HEL beam source, and upstream of the output optics; and one or more beam correction sensors and one or more tracking sensors. The one or more beam correction sensors and the one or more tracking sensors are downstream of the first beam correction elements and are upstream of the second beam correction elements.

According to an embodiment of any paragraph(s) of this summary, the one or more beam correction sensors are downstream of the one or more tracking sensors.

According to an embodiment of any paragraph(s) of this summary, the one or more beam correction sensors may include: a sensor of angular beam error; and a sensor of spatial beam error.

According to an embodiment of any paragraph(s) of this summary, the one or more tracking sensors are operatively coupled to beam correction elements controlling the HEL beam.

According to an embodiment of any paragraph(s) of this summary, the one or more tracking sensors are operatively coupled to the second beam correction elements to effect target tracking of a target.

According to an embodiment of any paragraph(s) of this summary, the second beam correction elements include a fast steering mirror.

According to an embodiment of any paragraph(s) of this summary, the second beam correction elements include a fast steering element.

According to an embodiment of any paragraph(s) of this summary, the second beam correction elements include a slow steering mirror.

According to an embodiment of any paragraph(s) of this summary, the second beam correction elements include an adaptive optic.

According to an embodiment of any paragraph(s) of this summary, the first beam correction elements include at least two steering mirrors.

According to an embodiment of any paragraph(s) of this summary, the first beam correction elements include at least two steering elements.

According to an embodiment of any paragraph(s) of this summary, the first beam correction elements include one or more adaptive optics.

According to an embodiment of any paragraph(s) of this summary, the first beam correction elements include correction with at least four degrees of freedom.

According to an embodiment of any paragraph(s) of this summary, the at least four degrees of freedom include at least two angular degrees of freedom, and at least two spatial degrees of freedom.

According to an embodiment of any paragraph(s) of this summary, the one or more beam correction sensors are operatively coupled to the first beam correction elements, to correct for errors in positioning of the HEL beam.

According to an embodiment of any paragraph(s) of this summary, the HEL beam source also emits an auto-alignment beam that is co-aligned with the HEL beam.

According to an embodiment of any paragraph(s) of this summary, the system further includes an upstream beam splitter and a downstream beam splitter; wherein the upstream beam splitter is upstream of the downstream beam splitter; and wherein the downstream beam splitter directs part of the auto-alignment beam to the one or more beam correction sensors.

According to an embodiment of any paragraph(s) of this summary, the system further includes a retroreflector.

According to an embodiment of any paragraph(s) of this summary, the retroreflector directs part of the auto-alignment beam back to the one or more track sensors.

According to an embodiment of any paragraph(s) of this summary, the system further includes a laser source for providing an additional laser beam for tracking the target.

According to an embodiment of any paragraph(s) of this summary, the additional laser beam passes through the first beam correction elements.

According to an embodiment of any paragraph(s) of this summary, the system further includes a source for a target illuminator beam, for providing an additional beam for tracking the target.

According to an embodiment of any paragraph(s) of this summary, the system further includes a source for a rangefinding beam, for providing an additional beam for tracking the target.

According to an embodiment of any paragraph(s) of this summary, the system further includes a source for a target illuminator beam, for providing an additional beam for tracking the target.

According to an embodiment of any paragraph(s) of this summary, the system further includes a source for a dazzler, such as a laser dazzler, for providing an additional beam for interacting with the target.

According to an embodiment of any paragraph(s) of this summary, the target illuminator beam, or range-finding beam, or dazzler, passes through the first beam correction elements.

According to an embodiment of any paragraph(s) of this summary, the system further includes a pickoff that diverts the target illuminator beam from an optical path followed by the HEL beam.

According to an embodiment of any paragraph(s) of this summary, the pickoff is downstream of the first beam correction elements and is upstream of the second beam correction elements.

According to another aspect of the invention, a method of operating an HEL weapon includes the steps of: sending an HEL beam of the HEL weapon through optics that are optically downstream of an HEL beam source of the HEL weapon; and correcting the path of the HEL beam that has passed through the optics, using first beam correction elements and second beam correction elements of the HEL weapon, wherein the first beam correction elements and the second beam correction elements are optically downstream of the HEL beam source; wherein the correcting of the optics is based at least in part on output from one or more beam correction sensors and/or one or more tracking sensors of the HEL weapon, with the one or more beam correction sensors and/or the one or more tracking sensors are downstream of the first beam correction elements and are upstream of the second beam correction elements.

According to an embodiment of any paragraph(s) of this summary, the method further includes operatively coupling the one or more beam correction sensors and the one or more tracking sensors together.

According to an embodiment of any paragraph(s) of this summary, the operatively coupling includes reflecting an alignment beam from between the one or more beam correction sensors and the one or more tracking sensors.

According to an embodiment of any paragraph(s) of this summary, the method further includes overlapping beams received by the one or more beam correction sensors and the one or more tracking sensors.

According to an embodiment of any paragraph(s) of this summary, the correcting the optics includes changing position of one or more fast steering elements of the one or more first beam correction elements, and changing position of one or more fast steering elements of the one or more second beam correction elements.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

A beam director system for a high-energy laser (HEL) weapon includes correction sensors that are able detect misalignments in optical elements throughout the entire optical path traversed by the high-energy laser. The system includes beam correction sensors that sense misalignments in a first part of the optical path, and high-speed track sensors that sense misalignments in a second part of the optical path, with the first part and the second part overlapping. This allows all optics to be sensed by the beam correction sensors and/or the high-speed track sensors. Any critical optical failure is thus promptly detected. The system can accommodate a wide variety of lasers for the HEL, preferably including a co-boresighted and aligned alignment laser. In addition the system may include provisions that simplify a tracking algorithm, for example by driving a steering mirror or other optical correction device directly from the high-speed track sensor. By having the track sensors further downstream on the optical path than in prior devices, the acquisition and trace sensor fields of view of the system may be improved.

Figure 1:
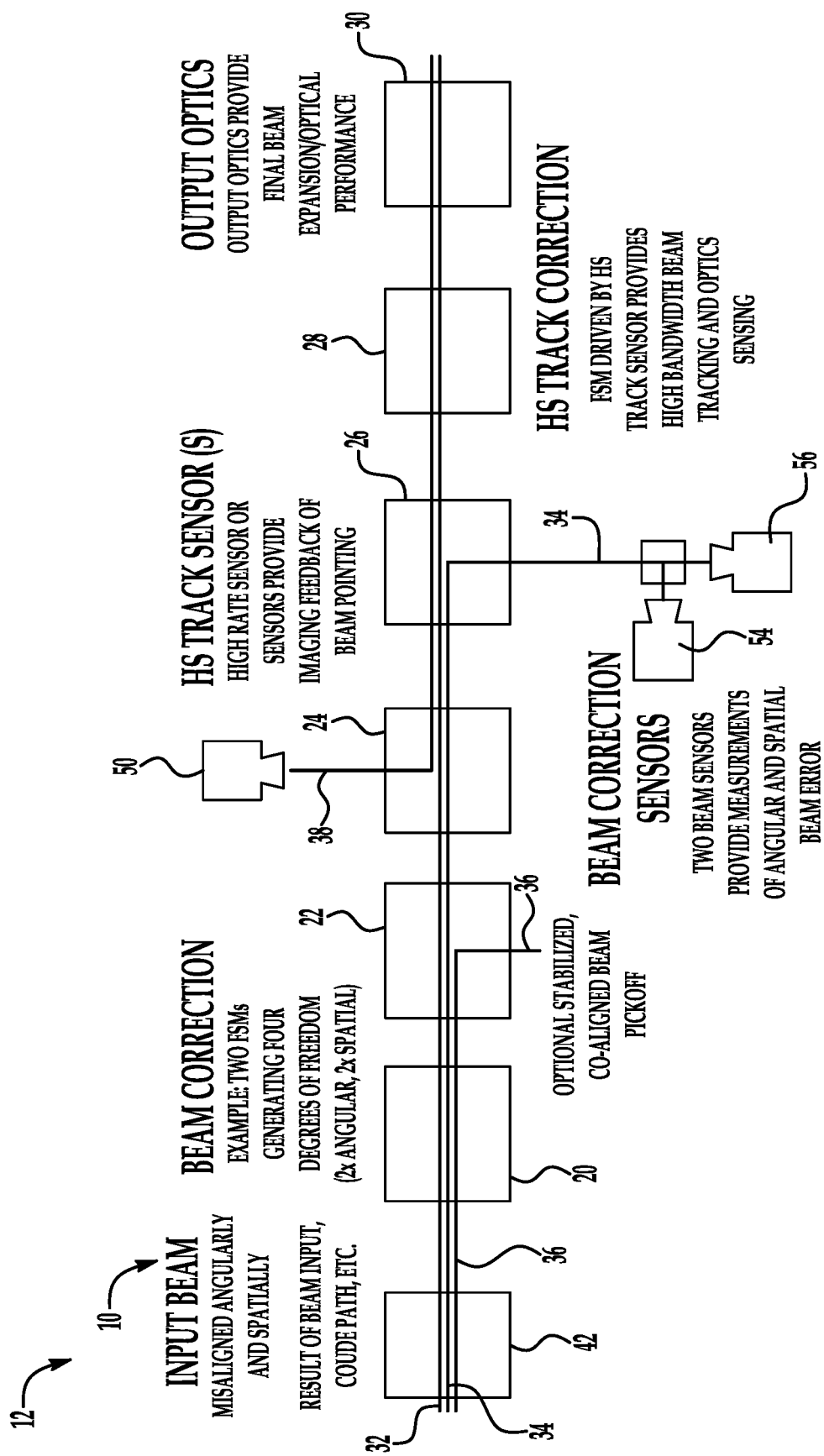
FIG. 1 is a block diagram of a beam director system according to an embodiment of the invention.

FIG. 1 shows a block diagram of a beam director system 10 for a high-energy laser (HEL) weapon 12. The system 10 includes several beams that have different characteristics and are used for different purposes, as explained further below. The beams are passed through optical elements, represented schematically by blocks 20, 22, 24, 26, 28, and 30. Each of the blocks 20, 22, 24, 26, 28, and 30 represents any individual or combination of possible optical elements, including reflective elements such as mirrors, transmissive elements such as lenses or filters, beam splitters, expanders, and/or other optical elements.

A series of light beams (or light from light sources) 32, 34, 36, and 38 pass through all or some of the blocks 20, 22, 24, 26, 28, and 30. The direction of movement through the blocks 20, 22, 24, 26, 28, and 30, in that order, is described herein as a downstream direction. This is the direction in which beams or other light are processed after being produced within the system 10, and then emitted from the system 10. This downstream direction is the direction that light travels from at least some light sources within the system 10. The opposite direction, in which light entering the system 10 from outside (such as light reflected off of a target) is referred to as the upstream direction.

The light beams include an HEL beam 32, an auto-alignment beam 34, a target or boresight illuminator beam 36, and imaging light 38 from an imaging source. In the illustrated embodiment the high-energy laser beam 32, the auto-alignment beam 34, and the target or boresight illuminator beam 36 all may be sent from various laser or other light sources 42, for example including an HEL beam source for the HEL beam 32. Some or all of the beams 32, 34, and 36 may be initially misaligned, for example being misaligned angularly and/or spatially. The beams 32, 34, and 36 first pass through the beam correction block 20 which can be used to correct the misalignment of some or all of the beams 32, 34, and 36. For example the beam correction block 20 may include fast steering mirrors (FSMs) that can be controlled to correct at least some of the misalignment of the beams 32, 34, and 36. In one non-limiting example, the block 20 may include two FSMs that are able to generate four degrees of freedom, two spatial (translational) and two angular, that are usable in correcting at least some of the misalignment of the beams 32, 34, and 36. Other devices and/or mechanisms for correcting beam misalignment are possible.

The block 22 represents a location where the target or boresight illuminator beam (or other beam used to meet mission parameters) 36 may be picked off (diverted). This is an optional feature, and in an alternative embodiment the pickoff block 22 may be omitted. In a non-limiting example the target or boresight illuminator beam 36 may be used to illuminate the target during firing of the HEL beam 32, to maintain target acquisition during the laser heating process. The beam 36 may be a lower-power high-divergence target illuminating laser, and target tracking during its use (described below) may be pared down the tracking to only that the wavelength that the beam 36 uses.

The block 24 represents a location where an incoming light beam 38 is directed to a high-speed tracking sensor 50. The light from an external light source 38 (from a target) travels in the opposite direction from the beams 32, 34, and 36, right to left in FIG. 1. The light 38 reached the tracking sensor pickoff block 24 after passing through (in order) the output optics in block 30, the high-speed tracking correction in block 28, and the beam correction pickoff block 26. The light 38 is return light, a reflection off of the target from illumination by one or more other beams emitted by the system 10, such as a reflection from the target illuminator beam 36, for the purpose of tracking of the target. Alternatively the light 38 may be passively tracked light from a target or other object, without illumination from the system 10. The target illuminator beam 36 may be a low-power laser beam following at least part of the same path and directed through at least some of the same optics as the high-energy laser beam 32. The target illuminator beam 36 may exit the system 10 without passing through all of the same optics as the high-energy laser beam 32. For example the target illuminator beam 36 may be 50-watt illuminator that exits the system 10 without passing through an expansion portion of the optics. Alternatively or in addition the target illuminator beam 36 may have other characteristics and/or functions, for example being a target illuminator beam, range-finding beam, and/or dazzler.

The tracking sensor 50 may be any of a variety of cameras or other sensors for target acquisition and tracking. In one embodiment the tracking sensor 50 may be a 30 Hz camera, for example capable of detecting short-wavelength infrared (SWIR) and/or near infrared (NIR) radiation. Output from the tracking sensor 50 may be used to provide imaging feedback and/or to position the HEL beam 32 on the target.

The block 26 represents a location where the auto-alignment beam 34 is directed to the beam correction sensors 54 and 56. The sensors 54 and 56 provide measurements of angular and spatial beam error. Alternatively the beam 34 may represent part of the HEL laser beam that is sent to the sensors 54 and 56 for determining appropriate correction. The auto-correction beam 34 is intended to be interpreted broadly to include a part of the main HEL beam 32.

The block 28 is for high-speed tracking correction block, where correction devices, such as fast steering mirrors, are used to correct any deficiencies in the beam error, such as errors introduced by misaligned optical elements. The correction block 28 uses as an input data from the sensors 54 and 56 to guide the fast steering mirrors.

It is an important advantage of the system that all of the optics in the blocks 20-30 are subject to monitoring by the sensors and correction by the correction portions. All of the optical elements are sensed by at least the sensor 50, or the sensors 54 and 56.

Figure 2:
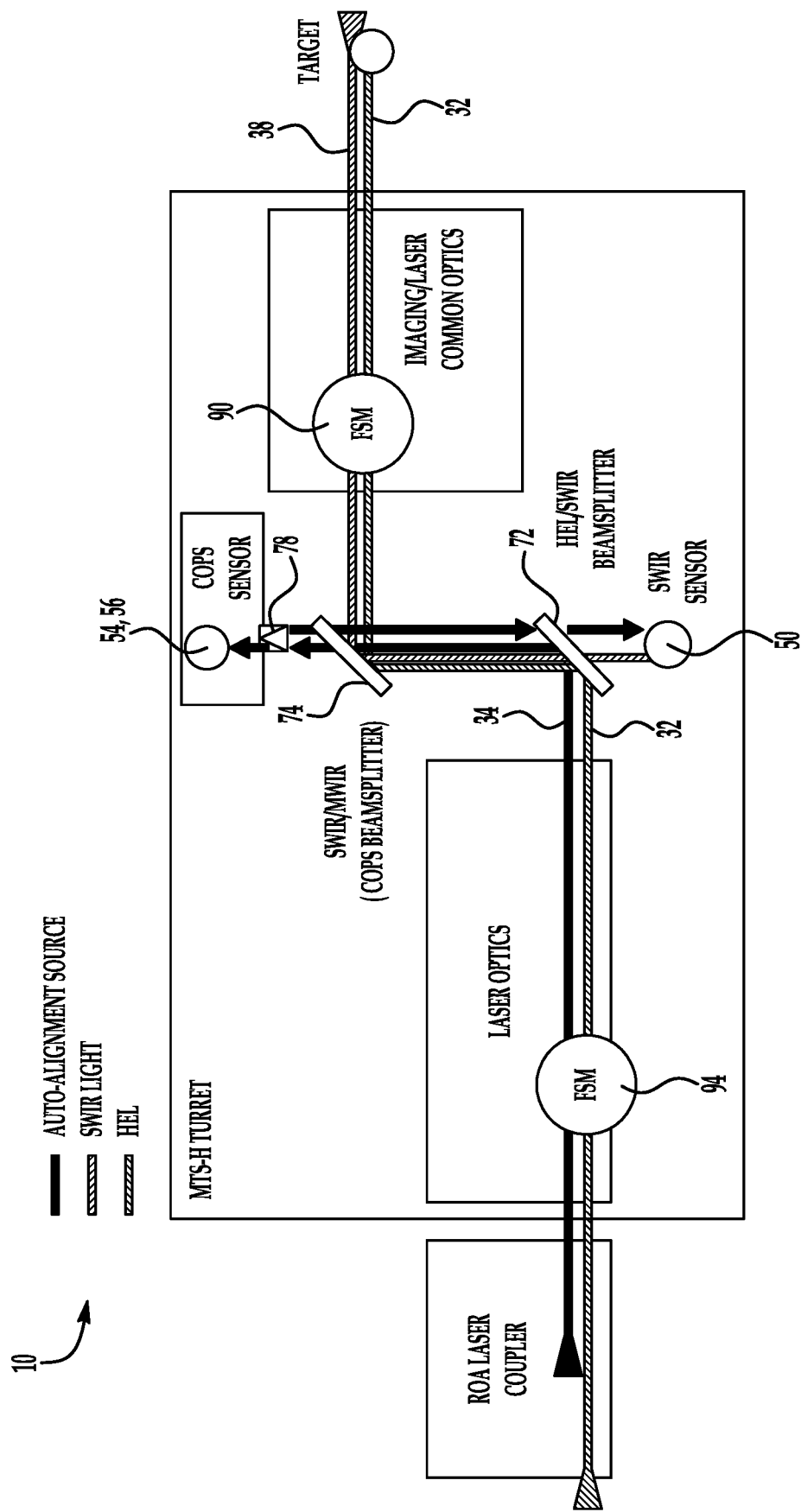
FIG. 2 is a schematic diagram of part of the beam director system of FIG. 1.

FIG. 2 shows some more detail about innovative aspects of the optical system 10, showing retroreflection between beam splitters 72 and 74. The beam splitters 72 and 74 are used to direct beams to the tracking sensor 50, and the beam correction sensors 54 and 56. The beam splitter 72 may be an HEL/SWIR beam splitter, which reflects the HEL beam 32 while splitting the short-wavelength infrared (SWIR) return light 38. The beam splitter 74 reflects the HEL beam 32 and the return light 38, while letting through the auto alignment beam 34, which may be an SWIR or a mid-wavelength infrared (MWIR) beam. The auto-alignment beam 34 is retro-reflected in a constant or selective way at a retro-reflector 78, which for example may be a switchable retro-cube, to tie together the output of both of the sensor systems (the tracking sensor 50, and the beam correction sensors 54 and 56). This tying together facilitates thermal correction in the sensor portions of the system 10.

As shown in FIG. 2, the tracking sensor 50 may be an SWIR sensor, or other sensor configured to detect an appropriate wavelength or range of wavelengths. The sensor 50 is operatively coupled to FSM 90 to control the FSM 90. The beam correction sensors 54 and 56 may be part of a laser beam optical positioning system, operatively coupled to FSM 94 for controlling the FSM 94.

Figure 3:
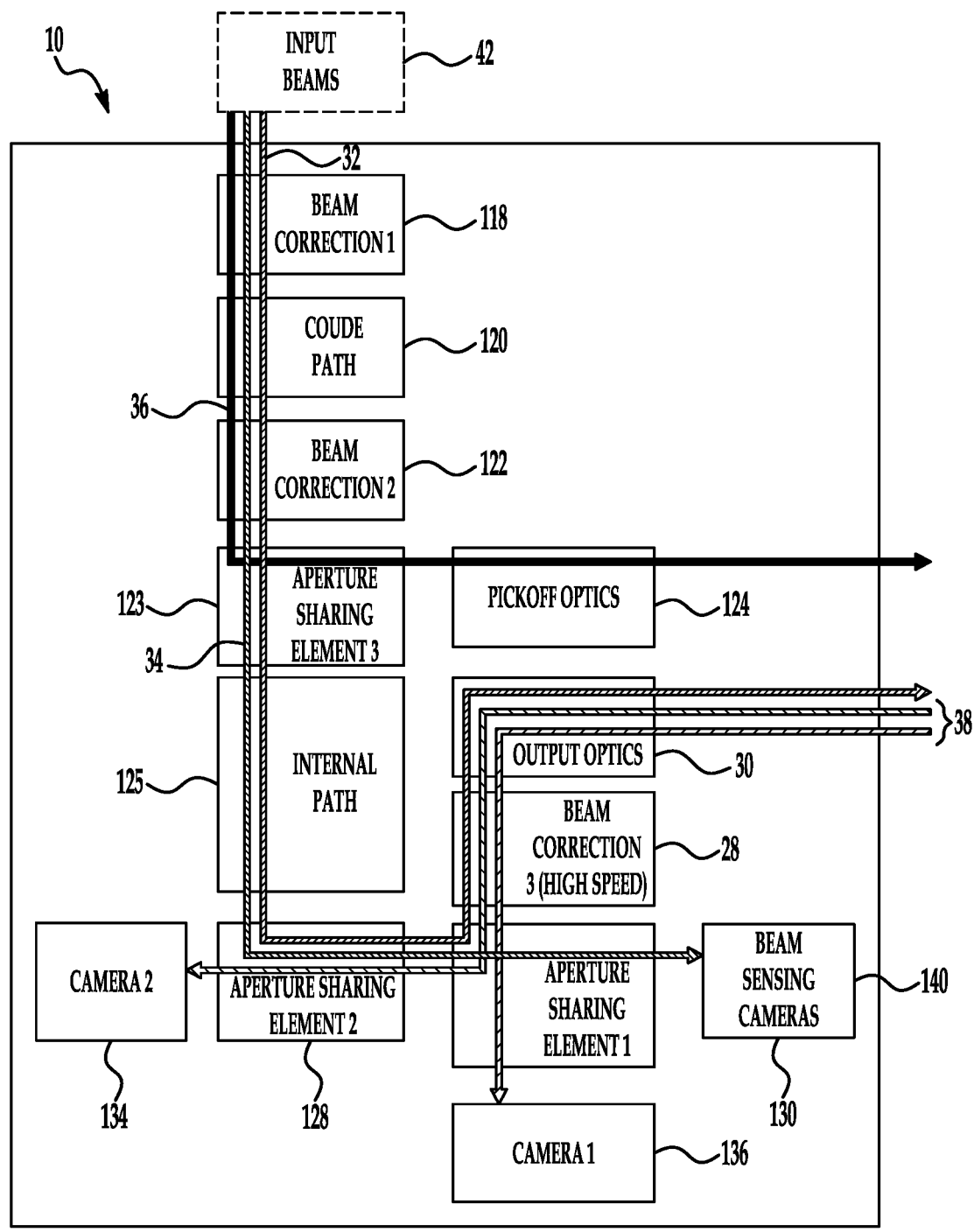
FIG. 3 is a schematic diagram of a high-energy laser (HEL) weapon that includes a beam director system, according to an embodiment of the invention.

FIG. 3 shows further details of the system 10, shown in a schematic arrangement. The schematic arrangement shown in FIG. 3 is an example purely for purposes of illustration, and it will be appreciated that the number, type, and arrangement of elements may vary for other embodiments of the system 10.

The light source 42 is the source for input beams 32, 34, and 36 into the system 10. The beams 32-36 pass through a first beam correction at 118, then through a coudé path 120 before encountering a second beam correction 122.

An aperture sharing element 123 is used to pickoff the beam 36, which is then sent through pickoff optics 124. The beams 34 and 36 proceed through an internal optical path 125 and to aperture sharing elements 128 and 130. The aperture sharing elements 128 and 130 sends incoming imaging light 38 to a pair of cameras 132 and 134. The aperture sharing element 130 also directs the auto-alignment beam 34 to beam sensing cameras 140.

The HEL beam 32 passes through the aperture sharing elements 128 and 130 to the beam correction 28, and then through output optics 30. From there the HEL beam 32 passes out of the system 10.

The various parts of the system 10 may include various types of optical elements. Such optical elements may include combinations of mirrors, beam splitters, lenses, beam expanders, focusing elements, beam directors, optical scrapers, and switches, to give a non-exhaustive list of possible elements.

The system 10 has the advantage that it can be used with any of a variety of high-energy lasers. In general, any HEL that includes a co-boresighted and aligned alignment laser would be suitable for use in the system 10.

Another advantage is in the modularity and simplification of the tracking algorithm that is used. There may be a simplified stabilization paradigm used to drive the fast-steering mirror(s) 90 of block 28 directly from the sensor 50.

By moving the tracking sensor 50 further downstream than in some prior systems, the field of view (FOV) of the system 10 may be improved. In addition, another advantage may be in the retro-reflection provided by the retro-reflector 78, which may allow for beam aimpoint analysis in the sensor 50. By utilization of the retro-reflection from the retro-reflector 78, the system 10 can actively link the beam correction sensor pointing solution from the beam correction sensors 54 and 56 to the pointing solution of tracking sensor 50 over time, temperature, shock, or other conditions detrimental to maintain key boresight requirements.

Finally, using a common input beam stabilization for all the input beams (from the FSM 94, for example) offloads the high-speed tracking error for auxiliary beams. As the beams have already been corrected onto the beam director optical bench by the FSM 94 by the beam correction sensors 54 and 56, the high speed track correction can be solely accomplished by the FSM 90 rather than having to couple in beam correction into the FSM 94, which would convolute the results from the tracking sensor 50, and the beam correction sensors 54 and 56.

Figure 4:
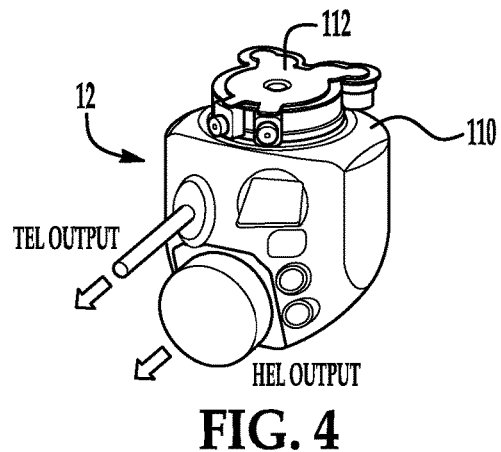
FIG. 4 is an oblique view of a housing that encloses (and is part of) an HEL weapon, according to an embodiment of the invention.
Figure 5:
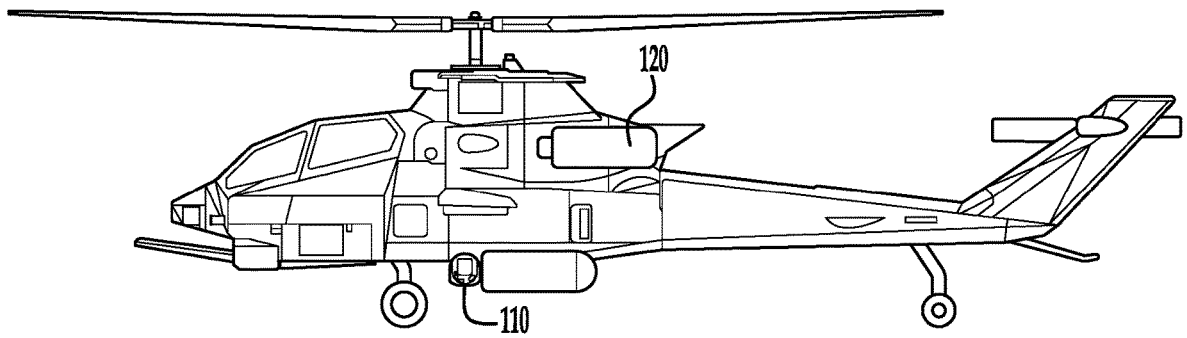
FIG. 5 shows an HEL weapon, an embodiment of the invention, mounted on a helicopter.
Figure 6:
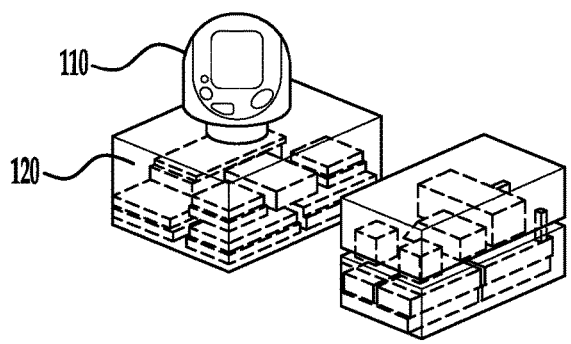
FIG. 6 shows an HEL weapon, an embodiment of the invention, mounted on a stationary structure.
Figure 7:
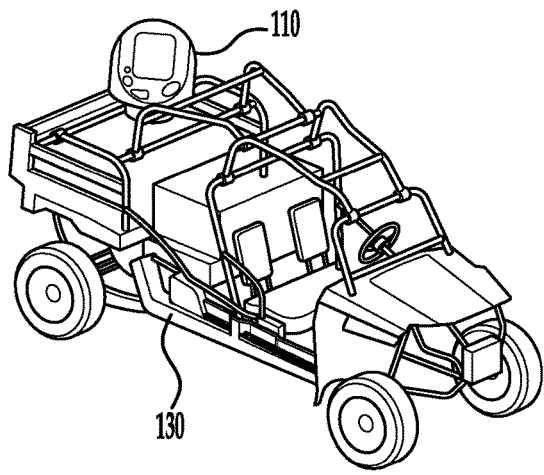
FIG. 7 shows an HEL weapon, an embodiment of the invention, mounted on a land vehicle.

FIG. 4 shows an example packaging of the weapon 12, within a spherical casing 110, with a mount 112. FIGS. 5-7 show three possible installations of the packaging shown in FIG. 4. FIG. 5 shows the casing 110 mounted on a helicopter 120. FIG. 6 shows the casing 110 mounted on a stationary installation 120. FIG. 7 shows the casing 110 mounted in a land vehicle 130. Many other installations/mountings are possible, for example on buildings or other stationary structures, on land vehicles of various types, on water vehicles of different types, and on aerospace vehicles (air or space) of many sorts.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A beam director system comprising:
   a high-energy laser (HEL) beam source for an HEL beam;
   output optics downstream of the HEL beam source;
   first beam correction elements downstream of the HEL beam source;
   second beam correction elements downstream of the HEL beam source, and upstream of the output optics; and
   one or more beam correction sensors and one or more tracking sensors;
   wherein the one or more beam correction sensors and the one or more tracking sensors are downstream of the first beam correction elements and are upstream of the second beam correction elements.

2. The system of claim 1, wherein the one or more beam correction sensors are downstream of the one or more tracking sensors.

3. The system of claim 1,
   wherein the one or more beam correction sensors include:
   a sensor of angular beam error; and/or
   a sensor of spatial beam error.

4. The system of claim 1, wherein the one or more tracking sensors are operatively coupled to the second beam correction elements to effect target tracking of a target.

5. The system of claim 1, wherein the second beam correction elements include a fast steering mirror.

6. The system of claim 1, wherein the first beam correction elements include at least two steering elements.

7. The system of claim 1, wherein the first beam correction elements include correction with at least four degrees of freedom.

8. The system of claim 7, wherein the at least four degrees of freedom include at least two angular degrees of freedom, and at least two spatial degrees of freedom.

9. The system of claim 1, wherein the one or more beam correction sensors are operatively coupled to the first beam correction elements, to correct for errors in positioning of the HEL beam.

10. The system of claim 1, wherein the HEL beam source also emits an auto-alignment beam that is co-aligned with the HEL beam.

11. The system of claim 10,
    further comprising an upstream beam splitter and a downstream beam splitter;
    wherein the upstream beam splitter is upstream of the downstream beam splitter; and
    wherein the downstream beam splitter directs part of the auto-alignment beam to the one or more beam correction sensors.

12. The system of claim 11,
    further comprising a retroreflector;
    wherein the retroreflector directs part of the auto-alignment back to the one or more track sensors.

13. The system of claim 1, further comprising a source for a target illuminator beam, range-finding beam, and/or dazzler, for providing an additional beam for tracking the target.

14. The system of claim 13, wherein the a target illuminator beam, range-finding beam, and/or dazzler passes through the first beam correction elements.

15. The system of claim 14, further comprising a pickoff that diverts the a target illuminator beam, range-finding beam, and/or dazzler from an optical path followed by the HEL beam.

16. The system of claim 15, wherein the pickoff is downstream of the first beam correction elements and is upstream of the second beam correction elements.

17. A method of operating a high-energy laser (HEL) weapon, the method comprising:
    sending an HEL beam of the HEL weapon through optics that are optically downstream of an HEL beam source of the HEL weapon; and
    correcting the path of the HEL beam that has passed through the optics, using first beam correction elements and second beam correction elements of the HEL weapon, wherein the first beam correction elements and the second beam correction elements are optically downstream of the HEL beam source;

wherein the correcting of the optics is based at least in part on output from one or more beam correction sensors and/or one or more tracking sensors of the HEL weapon, with the one or more beam correction sensors and/or the one or more tracking sensors are downstream of the first beam correction elements and are upstream of the second beam correction elements.

18. The method of claim 17, further comprising operatively coupling the one or more beam correction sensors and the one or more tracking sensors together;

wherein the operatively coupling includes reflecting an alignment beam from between the one or more beam correction sensors and the one or more tracking sensors.

19. The method of claim 17, further comprising overlapping beams received by the one or more beam correction sensors and the one or more tracking sensors.

20. The method of claim 17, wherein correcting the optics includes changing position of one or more fast steering mirrors of the one or more first beam correction elements, and changing position of one or more fast steering mirrors of the one or more second beam correction elements.

* * * * *